United States Patent
Berglund et al.

(10) Patent No.: US 7,181,328 B2
(45) Date of Patent: Feb. 20, 2007

(54) METHOD AND ARRANGEMENT FOR SELECTING A STARTING GEAR AND A VEHICLE COMPRISING THIS ARRANGEMENT

(75) Inventors: Sixten Berglund, Torslanda (SE); Anders Eriksson, Gothenburg (SE); Marcus Steen, Angered (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 11/306,581

(22) Filed: Jan. 3, 2006

(65) Prior Publication Data
US 2006/0200295 A1   Sep. 7, 2006

Related U.S. Application Data

(63) Continuation of application No. PCT/SE04/00927, filed on Jun. 11, 2004.

(30) Foreign Application Priority Data
Jul. 3, 2003   (SE) .................................... 0301982

(51) Int. Cl.
*G06F 17/00* (2006.01)

(52) U.S. Cl. ............................. 701/53; 701/52; 701/51; 701/66; 180/170; 180/53.62; 74/11

(58) Field of Classification Search .................. 701/51, 701/66, 53, 62; 180/53.6, 53.61, 53.62; 74/11, 74/13, 14, 15
See application file for complete search history.

(56) References Cited

U.S. PATENT DOCUMENTS

| | | | |
|---|---|---|---|
| 3,897,586 A | 7/1975 | Coker | |
| 4,735,109 A | 4/1988 | Richards | |
| 4,754,665 A | 7/1988 | Parker | |
| 4,849,006 A | 7/1989 | Knudson | |
| 4,894,182 A | 1/1990 | Cody et al. | |
| 5,030,667 A | 7/1991 | Shimizu | |
| 5,390,561 A | 2/1995 | Stine | |
| 5,455,767 A | 10/1995 | Staerker | |
| 5,679,741 A | 10/1997 | Breton et al. | |
| 5,816,100 A | 10/1998 | Fowler | |
| 6,658,339 B1 * | 12/2003 | Wright et al. | 701/53 |

* cited by examiner

*Primary Examiner*—Thomas Black
*Assistant Examiner*—Marie A Weiskopf
(74) *Attorney, Agent, or Firm*—Novak Druce + Quigg, LLP

(57) ABSTRACT

Method and arrangement for selecting a starting gear for a vehicle having an engine (3), an AMT-type transmission (5) and a power take-off (9) for maneuvering at least one body device on the vehicle. The method includes the steps of generating a first signal upon activation of the power take-off (9) for the maneuvering of at least one body device mounted on the vehicle. The gear selection strategy of the transmission (5) is controlled for selection of a predetermined starting gear in dependence on at least the first signal and maintaining the predetermined starting gear for as long as at least one predetermined condition is met.

17 Claims, 3 Drawing Sheets

METHOD AND ARRANGEMENT FOR SELECTING A STARTING GEAR AND A VEHICLE COMPRISING THIS ARRANGEMENT

CROSS-REFERENCE TO RELATED APPLICATIONS

The present application is a continuation patent application of International Application No. PCT/SE2004/000927 filed 11 Jun. 2004 which is published in English pursuant to Article 21(2) of the Patent Cooperation Treaty, and which claims priority to Swedish Application No. 0301982-5 filed 3 Jul. 2003. Said applications are expressly incorporated herein by reference in their entireties.

TECHNICAL FIELD OF THE INVENTION

The invention relates to a method and an arrangement for selecting a starting gear of a vehicle when the vehicle is maneuvered at low speed at the same time as some body arrangement on the vehicle is being used. The invention also relates to a computer program for causing a computer to execute such a method.

BACKGROUND OF THE INVENTION

At present, "Automated Mechanical Transmissions" or AMTs are becoming increasingly common in heavy-duty vehicles. With a view to determining the gear selection strategy for vehicles with AMT, an estimate or calculation is generally made of the current road resistance. The current road resistance is determined on the basis of input signals from a number of sensors, after which an electronic control unit determines a suitable gear selection strategy.

For the selection of a starting gear, this generally means that the control unit only pays heed to the weight of the vehicle and the gradient of the ground surface, whereupon it selects a starting gear offering optimal starting characteristics. This normally means that a relatively high starting gear is selected and that the transmission changes up as soon as the gear selection strategy allows. The intention is for the vehicle to be able to be started and reach cruising speed as quickly as possible.

This gear selection is not ideal on all occasions. For example, in the tipping of cargo from a platform, in tipping-related marshalling or in low-speed maneuvering at the same time as some body device on the vehicle is being used, a starting gear selected in the aforesaid manner may be unsuitable.

Through EP 1 1 03 742, for example, an AMT system can be seen in which the driver can manually select a preselected starting gear provided that this selection is accepted by the control unit of the transmission. If a power take-off is activated, the control unit will temporarily switch from automatic to manual gear mode.

This system calls on the driver to make certain settings with respect to the starting gear. In the event of a change of driver, problems may also arise if a previous driver has preselected a starting gear which is not suitable for the maneuver about to be performed.

U.S. Pat. No. 5,455,767 describes a way of controlling the transmission if the vehicle is in motion when the power take-off is activated. By detecting the particular power consumption of the power take-off, it is possible for the control unit of the transmission to move the gearshift points of the gear selection strategy. The method does not concern selection and/or locking of a starting gear under certain conditions. Moreover, the method requires the control unit to change to a manual transmission mode to allow the driver to select a starting gear.

An object of the invention is therefore to solve the aforementioned problems by offering a method in which the control unit of the transmission detects that a power take-off is active when starting from stationary or almost stationary, a preprogrammed starting gear being selected and maintained until at least one predetermined condition has been met, for example that the power take-off is deactivated. This occurs without the automatic gearshift mode of the vehicle being disengaged and without the driver needing to intervene.

SUMMARY OF THE INVENTION

In at least one embodiment, the invention takes the form of a method for selecting a starting gear for a vehicle that includes an engine, an AMT-type transmission and a power take-off for maneuvering at least one body device on the vehicle. The method includes the generation of a first signal upon activation of the power take-off for the maneuvering of at least one body device mounted on the vehicle, as well as controlling the gear selection strategy of the transmission for selection of a predetermined starting gear in dependence on at least the first signal, and maintenance of the predetermined starting gear for as long as at least one predetermined condition is met.

The condition for maintaining the predetermined starting gear can be constituted by a number of different parameters. One condition may be that a power take-off, in the form of a compressor, hydraulic pump or the like, is activated.

Other conditions may be that the displacement of the vehicle should exceed a predetermined distance, or that the speed of the vehicle has exceeded a certain speed for a predetermined time period. Suitable distances and/or speeds are selected with regard to the main field of application of the vehicle. This may be relevant for certain types of vehicle, such as cement mixers, in which a power take-off must be active both when starting and during travel for a vehicle with full load.

According to a further embodiment, the predetermined starting gear is constituted preferably, but not necessarily, by the lowest gear of the transmission. Selection of a starting gear can be preprogrammed with a recommended selection at the factory or later at the discretion of the user. The starting gear selection can, of course, subsequently be altered if, for example, the field of application of the vehicle is changed.

The selection of a starting gear by the transmission is preferably controlled independently of the particular, measured weight of the vehicle. It is possible, however, to program the control unit of the transmission to select a starting gear from a road-train-weight-dependent table stored in the memory of the control unit.

According to a further embodiment, the control unit selects an automated transmission mode with a gear selection strategy comprising the predetermined starting gear. Consequently, the driver has no need to intervene to select a starting gear, which would be the case if the control unit were conventionally to select a manual transmission mode.

The invention also takes the form of an arrangement for selecting a starting gear for a vehicle that includes an engine, an AMT-type transmission and a power take-off for maneuvering at least one body device on the vehicle. In addition, the arrangement comprises at least one sensor for generating a first signal upon activation of the power take-off for the maneuvering of at least one body device mounted on the vehicle and an electronic control unit for controlling the gear selection strategy of the transmission in dependence on at least said first signal, a predetermined starting gear being maintained for as long as at least one predetermined condition is met.

The electronic control unit is preferably set up to maintain the predetermined starting gear for as long as the power take-off is activated.

According to an alternative embodiment, the predetermined-starting gear is maintained until the displacement of the vehicle has exceeded a predetermined distance, or until the speed of the vehicle has exceeded a certain speed for a predetermined time period. This allows the electronic control unit to select another gear despite the fact that the power take-off is active. According to a further embodiment, the arrangement may be controlled so that gearshifting is permitted if a first power take-off is active, but is prohibited if a second power take-off is active.

The predetermined starting gear is preferably, but not necessarily, the lowest gear of the transmission. Alternatively, the starting gear may be selected from a road-train-weight-dependent table stored in the electronic control unit.

The invention also relates to a vehicle provided with an arrangement according to the above, which vehicle comprises an engine, an AMT-type transmission and a power take-off for maneuvering at least one body device on the vehicle. As has been described above, the arrangement comprises at least one sensor for generating a first signal upon activation of the power take-off for the maneuvering the body device mounted on the vehicle and an electronic control unit for controlling the gear selection strategy of the transmission in dependence on at least the first signal, a predetermined starting gear being maintained for as long as at least one predetermined condition is met.

The invention thus allows an automated transmission mode with a gear selection strategy comprising a predetermined starting gear. Consequently, the driver has no need to intervene to select a starting gear, which would be the case if the control unit were to conventionally select a manual transmission mode.

BRIEF DESCRIPTION OF THE DRAWINGS

The invention will be described in greater detail below using an illustrative embodiment with reference to the appended schematic drawing figures, and in which.

DETAILED DESCRIPTION

Figure 1:
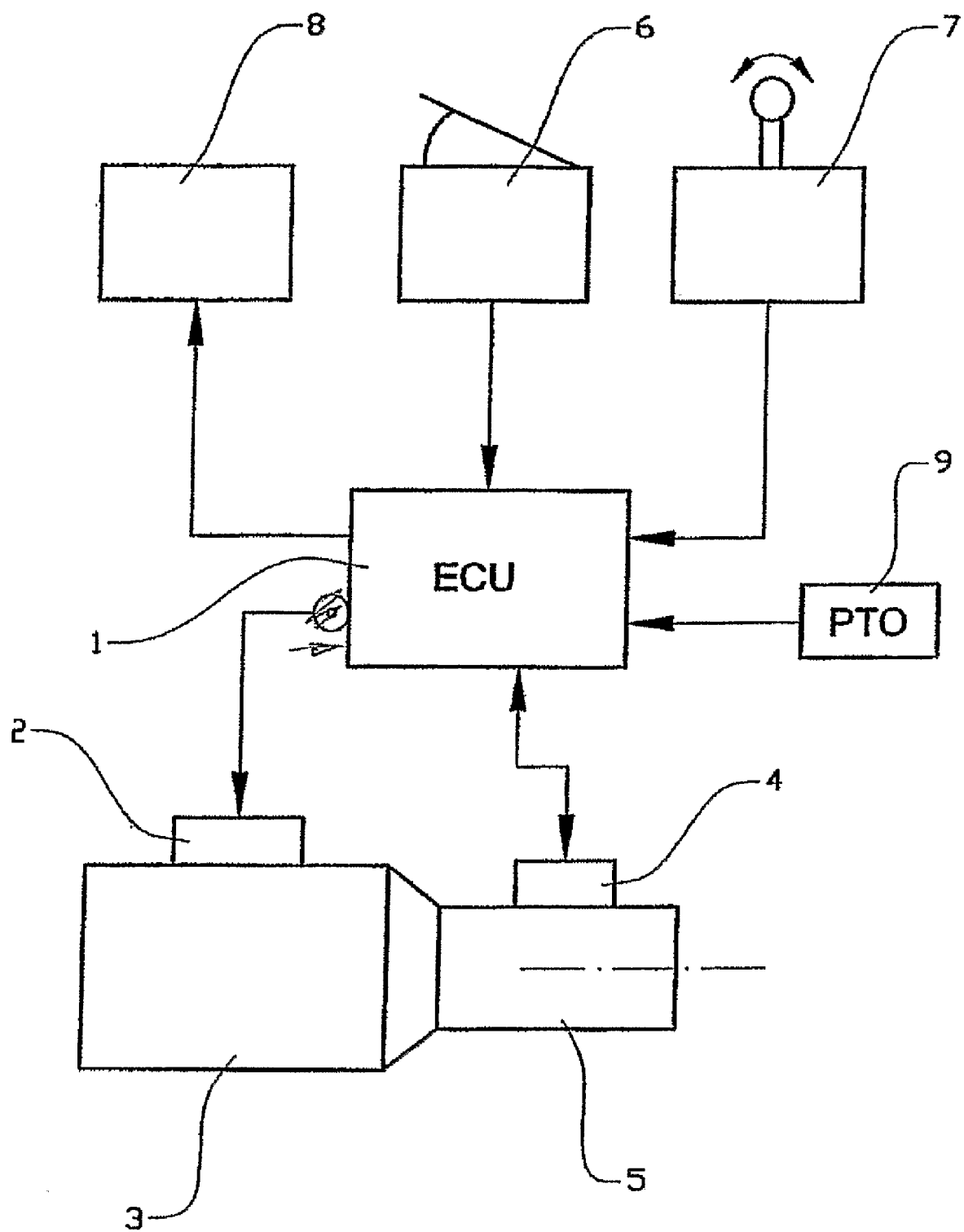
FIG. 1 is a schematic illustration of an automatic arrangement for selecting a starting gear according to the invention.

FIG. 1 shows a schematic illustration of an automatic arrangement for selecting a starting gear according to the teachings of the present invention. The arrangement comprises (includes, but is not necessarily limited to) a central electronic control unit (ECU) 1 that is connected to an engine control unit 2 for an engine 3 and a transmission control unit 4 for an automated transmission (AMT) 5. The engine control unit 2 receives signals from a number of sensors (not shown) for engine speed, engine torque, road speed, road-train weight, road gradient and the like. The central electronic control unit 1 receives signals from a gas pedal 6 controlled by the driver, a gear selector 7, and data from the engine control unit 2 comprising a number of engine-related operating parameters. On the basis of these received signals, the central electronic control unit 1 selects a suitable gear selection strategy from a number of strategies stored in a memory integrated in the control unit 1. Signals relating to gear selection are then sent to the transmission control unit 4 of the automated transmission 5, which performs a gearshift into the requested gear. At the same time, signals are sent to the engine control unit 2, requesting the desired engine speed. Transmissions of this type are previously commonly known by virtue of EP 1 1 03 742, U.S. Pat. No. 5,816,100, U.S. Pat. No. 5,390,561, U.S. Pat. No. 4,754,665 and U.S. Pat. No. 4,735,109, for example, and will not be described in further detail.

A signal representing gear selection is also sent to a display 8 which provides the driver with confirmation of the gear which is currently selected.

Apart from the above signals, the central electronic control unit 1 receives a further signal from a power take-off (PTO) 9 whenever it is activated. The power take-off can be exemplarily constituted by a compressor, hydraulic pump or the like and is used to drive a body unit on the vehicle. The power take-off can also be mounted for direct driving by the engine of the vehicle.

Figure 2:
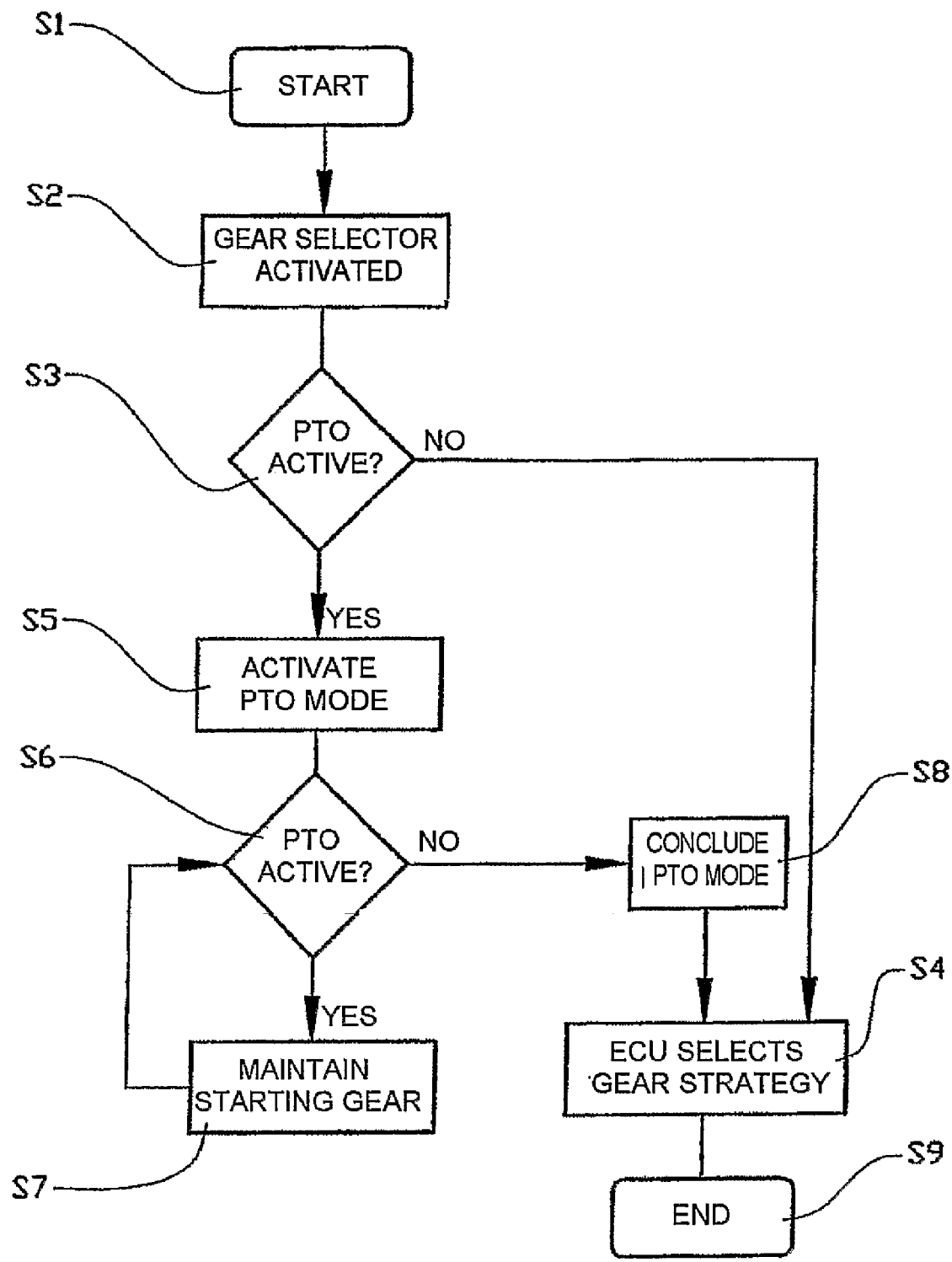
FIG. 2 is a flow chart illustrating an exemplary arrangement control according to the invention.

FIG. 2 shows a schematic illustration of a flow chart for controlling an arrangement according to the invention. The control is started (S1) when the driver activates the gear selector (S2) for a stationary vehicle. The central electronic control unit, hereinafter referred to as the ECU of the vehicle, checks in this case whether a power take-off is active (S3). If this is not the case, the ECU of the vehicle selects a suitable starting gear on the basis of a gear selection strategy based on the road-train weight of the vehicle and the particular gradient of the road. If a power take-off is active, a so-called PTO mode is instead activated in which the ECU of the vehicle selects and locks the transmission in respect of a predetermined starting gear. Thereafter, the ECU of the vehicle will continuously monitor whether the particular power take-off is active (S6) and will maintain the selected starting gear S7 until the power take-off is deactivated. When this occurs, the PTO mode is deactivated (S8) and the ECU of the vehicle reverts to selecting a gear (S4) on the basis of a gear selection strategy based on the road-train weight of the vehicle, the gradient of the road and the requested torque from the driver. The regulation of the starting of the vehicle is herewith concluded (S9).

Figure 3:
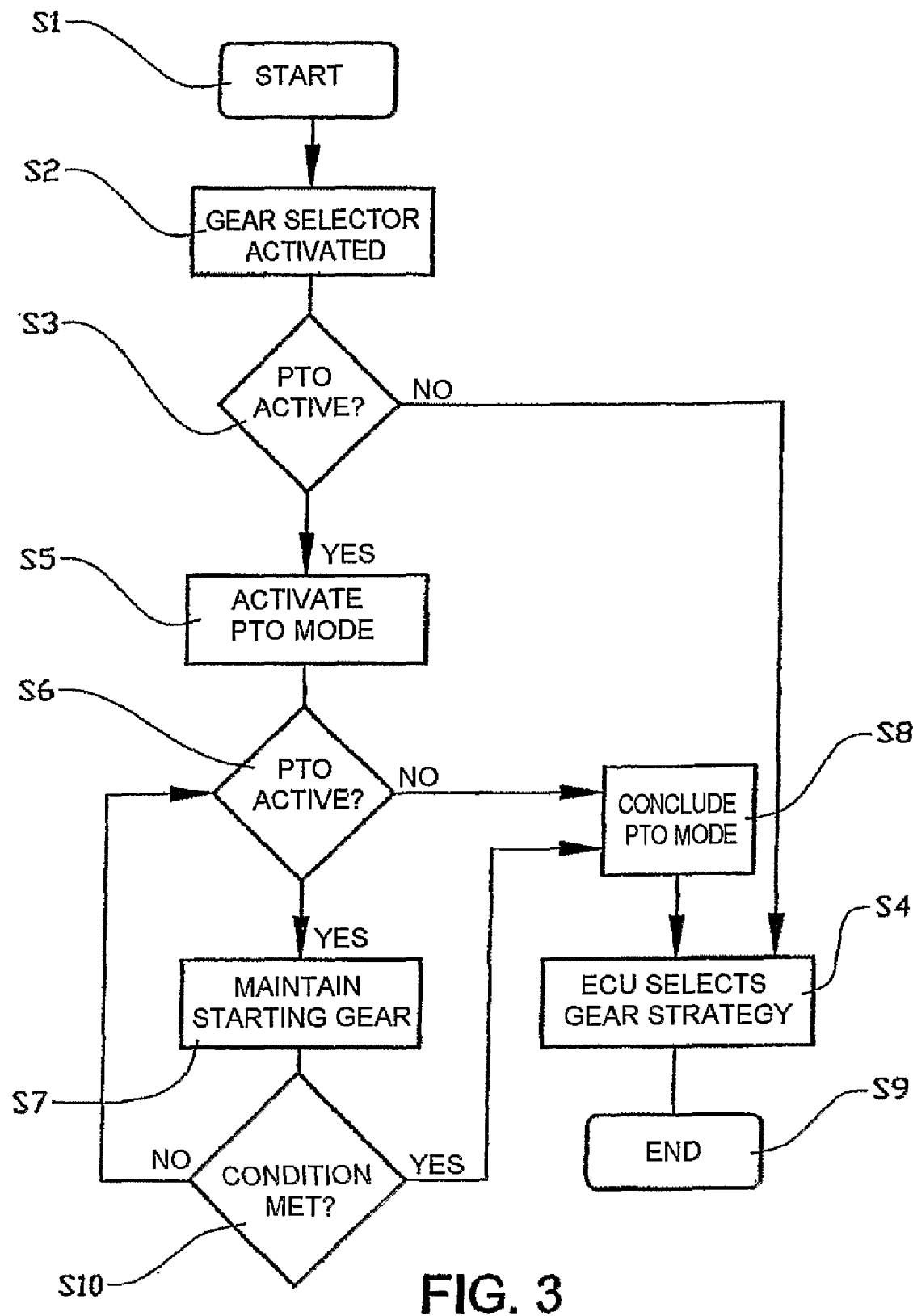
FIG. 3 is a flow chart illustrating an example for controlling an alternative arrangement according to the invention.

FIG. 3 shows a schematic illustration of a flow chart for controlling an alternative arrangement according to the invention. The vehicle is initially regulated in the same way as described in FIG. 2. After a PTO mode has been activated (S5), the ECU of the vehicle will commence monitoring the particular power take-off (S6) and will maintain the selected starting gear (S7). Monitoring does however involve a further step, in which the ECU of the vehicle checks whether a further condition is met (S10). As long as this condition is not met, the monitoring of the power take-off continues. If, on the other hand, the condition proves to have been met, said PTO mode is concluded (S8) and the ECU of the vehicle reverts to selecting a gear (S4) according to FIG. 2 above. Examples of such a condition can be that the displacement of the vehicle has exceeded a predetermined distance,—or that the-speed-of-the vehicle has exceeded a certain speed for a predetermined time period. The invention is not limited to the above and to illustrative embodiments shown in the drawings, but can be varied within the scope of the following patent claims.

What is claimed is:

1. A method for selecting a starting gear for a vehicle comprising an engine (3), an AMT-type transmission (5) and a power take-off (9) for maneuvering at least one body device on the vehicle, said method comprises:
   generating a first signal upon activation of the power take-off (9) for the maneuvering of at least one body device mounted on the vehicle;
   controlling a gear selection strategy of the transmission (5) to select a predetermined starting gear in dependence at least in part on said first signal; and
   maintaining the predetermined starting gear for as long as at least one predetermined condition is met.

2. The method as recited in claim 1, wherein the predetermined starting gear is maintained for as long as the power take-off (9) is activated.

3. The method as recited in claim 1, wherein the predetermined starting gear is maintained until the displacement of the vehicle has exceeded a predetermined distance.

4. The method as recited in claim 1, wherein the predetermined starting gear is maintained until the speed of the vehicle has exceeded a certain speed for a predetermined time period.

5. The method as recited in claim 1, further comprising:
   controlling the transmission (5) so that the starting gear is the lowest gear of the transmission (5).

6. The method as recited in claim 1, wherein the starting gear is selected from a road-train-weight-dependent table.

7. The method as recited in claim 1, wherein control of the transmission (5) further comprises selecting an automated transmission mode having a gear selection strategy that includes selection of the predetermined starting gear.

8. The method as recited in claim 1, wherein the steps of the method are executed via a computer program comprised of program code run on a computer.

9. The method as recited in claim 1, wherein the steps of the method are executed via a computer program comprised of program code stored on a computer-readable medium and run on a computer.

10. The method as recited in claim 1, wherein the steps of the method are executed via a computer program product directly loadable into an intermediate memory of a digital computer and comprised of program code stored on a computer-readable medium and run on a computer.

11. An arrangement for selecting a starting gear for a vehicle that includes an engine, an AMT-type transmission (5) and a power take-off (9) for maneuvering at least one body device on the vehicle, said arrangement comprising:
   at least one sensor that generates a first signal upon activation of the power take-off (9) for the maneuvering of at least one body device mounted on the vehicle; and
   an electronic control unit (1) that controls the gear selection strategy of the transmission (5) at least in part in dependence on said first signal and maintains a predetermined starting gear for as long as at least one predetermined condition is met.

12. The arrangement as recited in claim 11, wherein the electronic control unit (1) maintains the predetermined starting gear for as long as the power take-off (9) is activated.

13. The arrangement as recited in claim 11, wherein the electronic control unit (1) maintains the predetermined starting gear until the displacement of the vehicle has exceeded a predetermined distance.

14. The arrangement as recited in claim 11, wherein the electronic control unit (1) maintains the predetermined starting gear until the speed of the vehicle has exceeded a certain speed for a predetermined time period.

15. The arrangement as recited in claim 11, wherein the starting gear is the lowest gear of the transmission (5).

16. The arrangement as recited in claim 11, wherein the starting gear is selected from a road-train-weight-dependent table stored-in-the- electronic control unit (1).

17. A vehicle comprising:
   an engine (3);
   an AMT-type transmission (5); and
   a power take-off (9) for maneuvering at least one body device on the vehicle;
   at least one sensor that generates a first signal upon activation of the power take-off (9) for the maneuvering of at least one body device mounted on the vehicle; and
   an electronic control unit (1) that controls the gear selection strategy of the transmission (5) in dependence on at least said first signal and maintains a predetermined starting gear for as long as at least one predetermined condition is met.

* * * * *